US007983700B2

(12) United States Patent
An

(10) Patent No.: US 7,983,700 B2
(45) Date of Patent: Jul. 19, 2011

(54) BROADCAST INFORMATION TRANSMITTING APPARATUS AND METHOD FOR A MOBILE COMMUNICATION TERMINAL

(75) Inventor: Bo-Mi An, Seoul (KR)

(73) Assignee: LG Electronics Inc., Seoul (KR)

( * ) Notice: Subject to any disclaimer, the term of this patent is extended or adjusted under 35 U.S.C. 154(b) by 730 days.

(21) Appl. No.: 11/461,304

(22) Filed: Jul. 31, 2006

(65) Prior Publication Data

US 2007/0026902 A1 Feb. 1, 2007

(30) Foreign Application Priority Data

Jul. 29, 2005 (KR) ........................ 10-2005-0069923

(51) Int. Cl.
*H04W 4/00* (2009.01)

(52) U.S. Cl. ... 455/466; 455/3.02; 455/3.05; 455/412.1; 455/412.2; 725/32; 725/39; 725/40

(58) Field of Classification Search .... 455/412.1–412.2, 455/414.1, 414.3, 456.1–456.6, 457, 566, 455/466, 3.01–3.03; 725/34–42, 45, 46, 725/50, 54, 55, 58, 60–63, 73, 74, 86, 87, 725/100–104, 106
See application file for complete search history.

(56) References Cited

U.S. PATENT DOCUMENTS

| | | | | |
|---|---|---|---|---|
| 7,583,957 B2 * | 9/2009 | Lee | 455/414.3 |
| 2002/0184096 A1 * | 12/2002 | Kawahara et al. | 705/14 |
| 2003/0005448 A1 * | 1/2003 | Axelsson et al. | 725/58 |
| 2003/0026424 A1 * | 2/2003 | McGarrahan et al. | 380/255 |
| 2005/0091683 A1 * | 4/2005 | Sheynman et al. | 725/34 |
| 2005/0204381 A1 * | 9/2005 | Ludvig et al. | 725/34 |
| 2006/0075026 A1 * | 4/2006 | Ryu et al. | 709/206 |
| 2006/0173962 A1 * | 8/2006 | Ylonen | 709/206 |
| 2006/0190966 A1 * | 8/2006 | McKissick et al. | 725/61 |
| 2007/0202922 A1 * | 8/2007 | Myllynen et al. | 455/566 |
| 2007/0293250 A1 * | 12/2007 | Kim | 455/466 |

FOREIGN PATENT DOCUMENTS

| | | |
|---|---|---|
| CN | 1520683 | 8/2004 |
| KR | 10 2002 0006928 A | 1/2002 |

* cited by examiner

*Primary Examiner* — Wayne Cai
(74) *Attorney, Agent, or Firm* — Lee, Hong, Degerman, Kang & Waimey

(57) ABSTRACT

A mobile communication terminal comprises a display for displaying broadcast content; a controller for extracting broadcast information about broadcast content displayed on the display unit and for storing the broadcast information in a first message; and a transceiver for transmitting the first message to a second mobile communication terminal, such that the second mobile communication terminal is configured to display the broadcast content based on the broadcast information.

13 Claims, 5 Drawing Sheets

FIG. 4

| | | | | |
|---|---|---|---|---|
| MIN | ESN | TELEPHONE NUMBER OF RECEIVER | . . . | BROADCAST INFORMATION |

BROADCAST INFORMATION TRANSMITTING APPARATUS AND METHOD FOR A MOBILE COMMUNICATION TERMINAL

CROSS-REFERENCE TO RELATED APPLICATION

Pursuant to 35 U.S.C. §119(a), this application claims the benefit of the earlier filing date and right of priority to Korean Application No. 10-2005-0069923, filed on Jul. 29, 2005, the contents of which is hereby incorporated by reference in its entirety.

FIELD OF THE INVENTION

The present invention relates to a mobile communication terminal, and more particularly, to a broadcast information transmitting apparatus and method for transmitting broadcast information about a content being broadcasted on a broadcast channel of a mobile communication terminal.

BACKGROUND

Generally, a broadcast terminal (hereinafter, referred to as "terminal") is a mobile communication terminal configured for receiving multimedia information or data while a user is traveling. A digital multimedia broadcasting (DMB), a digital video broadcasting handheld (DVB-H), a media-forward link only (Media-Flo) are examples of commercial versions of products that implement the related broadcasting service technology.

Using these broadcasting services, users can watch various multimedia broadcasts on multi-channels through a personal receiver or a receiver for a car, which is equipped with a non-directional receiving antenna even while moving. In order to inform other users about a broadcast program, users need to communicate with the other users by way of making a phone call and verbally notifying them about information related to the content being broadcasted. This is inconvenient to the user. Systems and methods are needed to overcome said shortcoming.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a mobile communication terminal is provided that comprises a display for displaying broadcast content; a controller for extracting broadcast information about broadcast content displayed on the display unit and for storing the broadcast information in a first message; and a transceiver for transmitting the first message to a second mobile communication terminal, such that the second mobile communication terminal is configured to display the broadcast content based on the broadcast information.

The mobile communication terminal may further comprise a memory for storing the extracted broadcast information, wherein the controller comprises a logic unit for reading the broadcast information from the memory when a contact data for transmitting the first message is received. The contact data may comprise a phone number, or an email address. The first message can be transmitted over a short messaging service (SMS) protocol, for example.

In one embodiment, the broadcast information comprises data identifying a broadcast channel on which the broadcast content is being broadcast The broadcast information comprises data identifying timing information associated with the broadcast content being displayed on the display, wherein the timing information comprises at least one of a start, end, and duration for the broadcast content. The broadcast information may also comprise data providing parental guidance information for the broadcast content. In certain embodiments, the second mobile terminal can be manipulated to select the broadcast content for display on a display of the second mobile terminal.

In accordance with another embodiment, a method for transmitting information about broadcast content displayed on a mobile communication terminal is provided. The method comprises extracting broadcast information about broadcast content displayed on a display unit; storing the broadcast information in a first message; and transmitting the first message to a second mobile communication terminal, such that the second mobile communication terminal is configured to display the broadcast content based on the broadcast information. The method may further comprise storing the extracted broadcast information in memory and reading the broadcast information from the memory when a contact data for transmitting the first message is received.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4 is a view illustrating a structure of a message where broadcast information is recorded according to an embodiment of the present invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

In the following description, well-known function or constructions are not described in detail since they would obscure the invention in unnecessary detail. Particular detailed descriptions such as a specific processing flow are made to help general understanding of the present invention. It will be understood by those of ordinary skill in the art that the present invention is not limited to the particular detailed descriptions.

Figure 1:
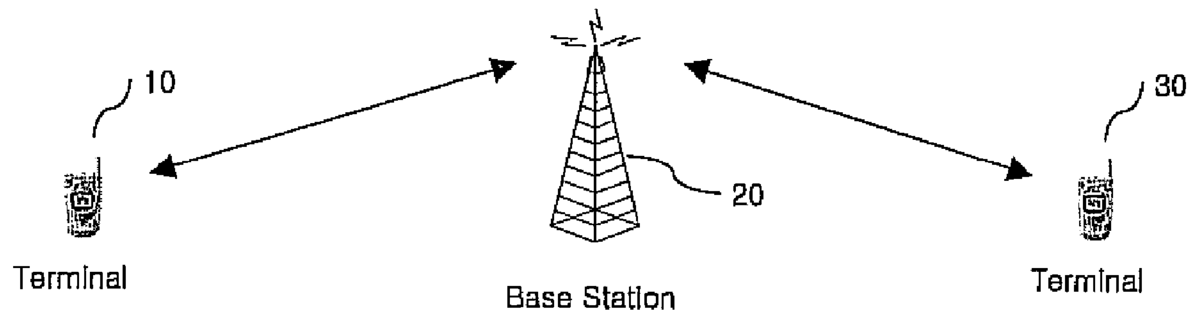
FIG. 1 illustrates a mobile communication network for a communicating data between one or more mobile communication terminals, according to one embodiment.
Figure 2:
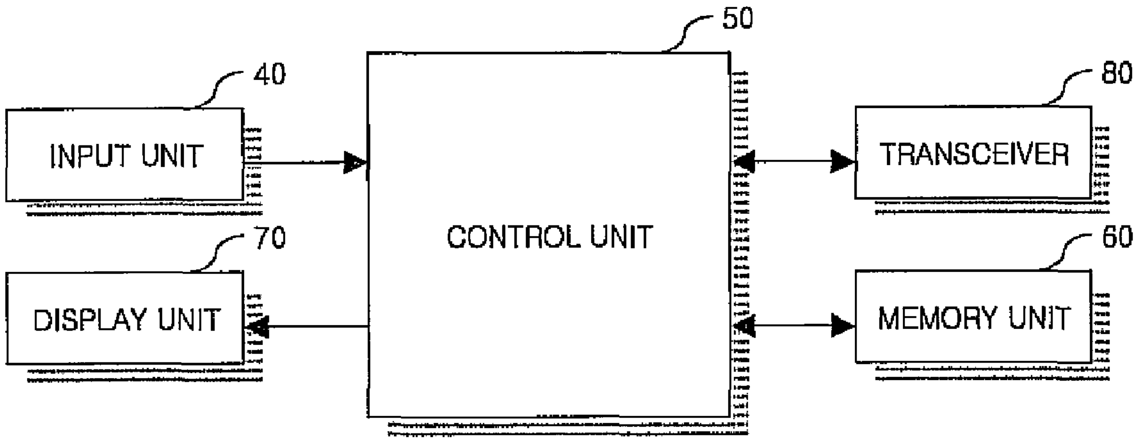
FIG. 2 is a block diagram of a system for transmitting broadcast information according to one embodiment.

As illustrated in FIG. 1, a base station 20 establishes communication between terminals 10 and 30, over which voice and data is transmitted. As illustrated in FIG. 2, a terminal according to the present invention comprises a display unit 70, an input unit 40, a control unit 50, a memory unit 60, and a transceiver 80. The display unit 70 displays broadcast data. The input unit 40 is used to input a command to the terminal in order to transmit information on a broadcast channel.

The control unit 50 records, in one or more fields of a message (shown in FIG. 4), information about the broadcast content. The memory 60 can be used to store broadcast information about broadcasting content received on a broadcast channel. The transceiver unit 80 transmits or receives the content as contained in one or more messages.

In one embodiment, the control unit 50 comprises a logic module that extracts channel information from the broadcast content and stores the channel information in the memory unit 60. When a telephone number is input to the input unit 40 or a telephone number stored in the memory unit 60 is selected, the logic module records in the memory unit 60 information about the broadcast channel or the related identifying data for content being displayed on the display unit 70.

The identifying data can be either stored in memory unit 60 and retrieved later to be included in a message to be transmitted to a target terminal, or the identifying data can be directly included in the message without being stored in memory unit 60. Identifying information hereinafter also referred to broadcast information comprises information about the broadcast channel for the broadcast content displayed on the display unit 70, or the related data such as start and end time for the broadcast, the duration of the broadcast, length of time left until the broadcast content or program ends, or programming information (e.g., parental guidance data, etc.).

When a user is to watch a broadcasting program, a broadcasting program list including program starting/ending information, a length of a program name, a uniform resource locator (URL), a broadcasting program channel, a broadcast time, a viewable age, a remaining running time of the broadcasting program, and program detail information is downloaded through a WIPI Application provided at the mobile communication terminal.

When the broadcasting program list including additional information is downloaded, the WIPI Application extracts broadcasting information recorded in a field of the additional information from the broadcasting program.

Referring to FIG. 2, in an exemplary scenario, while the broadcast content is being received by the transceiver unit 80, the control unit 50 extracts information of a current broadcast program.

Figure 3:
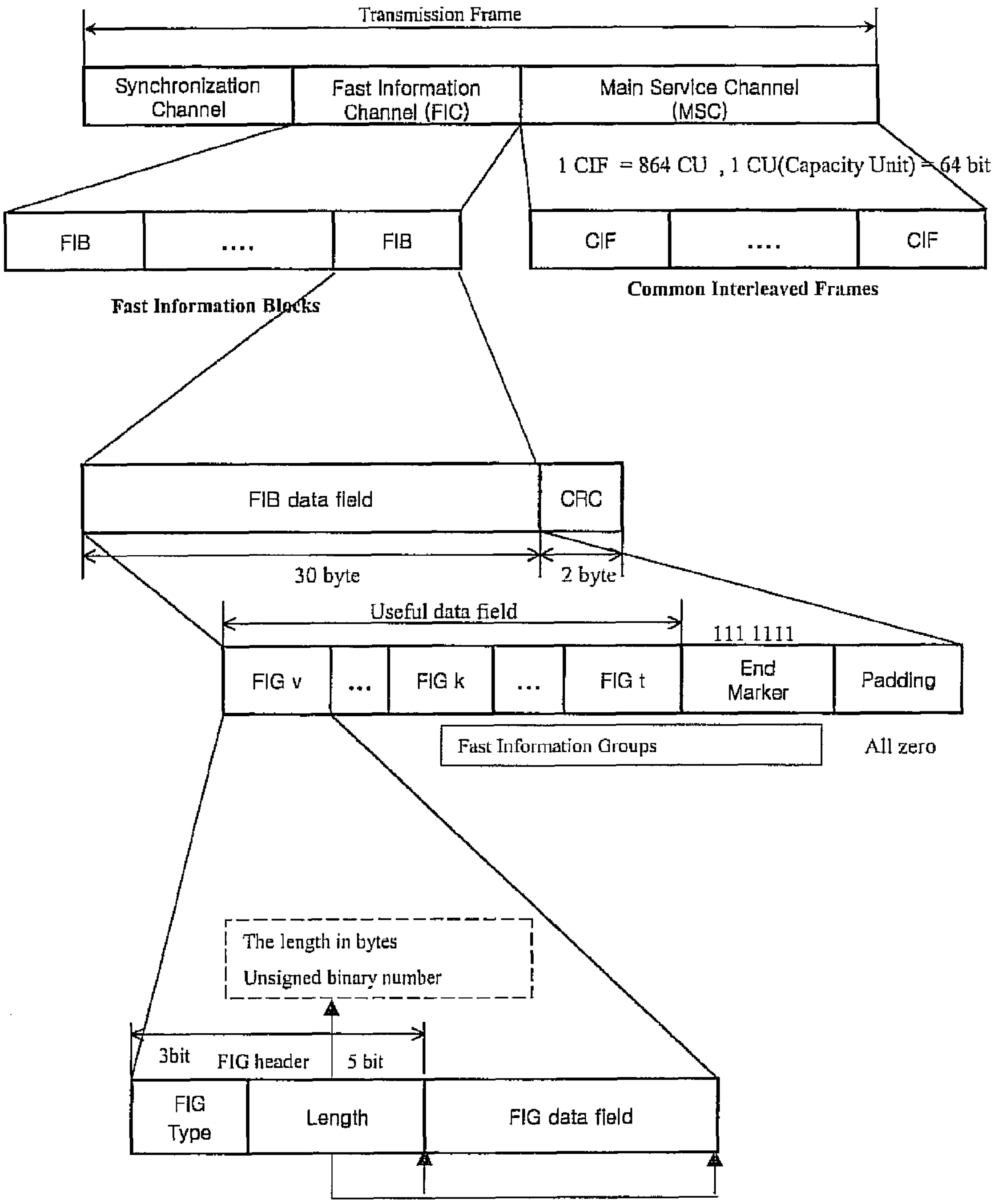
FIG. 3 is a view showing a structure of a broadcast data frame according to a first embodiment of the present invention.

FIG. 3 is a view showing a structure of a broadcast data frame according to a first embodiment of the present invention.

As shown, a frame of broadcast data according to the present invention comprises: a synchronization for orthogonal frequency division multiplexing (OFDM) synchronization; a fast information channel (FIC) for transmitting a control signal and information of a main service channel (MSC) to a receiver; and an MSC for multiplexing a plurality of audio/video signals and a data channel.

The FIC consists of a plurality of fast information blocks (FIB). One FIB consists of a plurality of fast information groups (FIG). Also, one FIG consists of a FIG type, a FIG length, and a FIG data field.

The FIG type shows recorded information of a broadcast channel and data. For instance, when the FIG type is '0', there are provided information for identifying a broadcast station, information for identifying a channel or for identifying whether the channel is TV or a radio in case of the same broadcast station, and channel information including a frequency. On the contrary, when the FIG type of '1', a genre of a broadcast program, that is, drama, show, comedy, cinema, etc. is included in the FIG. type.

In order to transmit the broadcast information about the broadcast content a user preferably inputs the telephone number or other contact information (e.g., email address) of a receiving device and presses a predetermined button on the input unit 40 (for example, a "send" button).

The control unit 50, depending on implementation, reads the through the broadcast program list and the broadcast information stored in the memory unit 60 and records the broadcast information in a message to transmit the message to the base station 20 through the transceiver 80. FIG. 4 illustrates an exemplary structure of the message where the broadcast information is recorded according to one embodiment. The message may comprise a mobile identification number (MIN), an electronic serial number (ESN), the telephone number of the target terminal, and a field to store identifying data about the broadcast content or channel.

The MN is configured for displaying the telephone number assigned to the transmitting terminal. The ESN is a device serial number that is inserted in a microchip of the terminal to prevent fraudulent use. When the user makes a telephone call, the MIN and the ESN are automatically transmitted to the base station 20, and the telephone call is connected after the numbers are certified.

When the message including the broadcast information sent from terminal 10 is received by the target device (e.g., terminal 30), a request for a call connection is displayed on a display of the target device. In one embodiment, a message is displayed on the display to indicate to the user information about the broadcast content. The target terminal is configured to tune in the identified broadcast channel and display the respective broadcast content.

Figure 5:
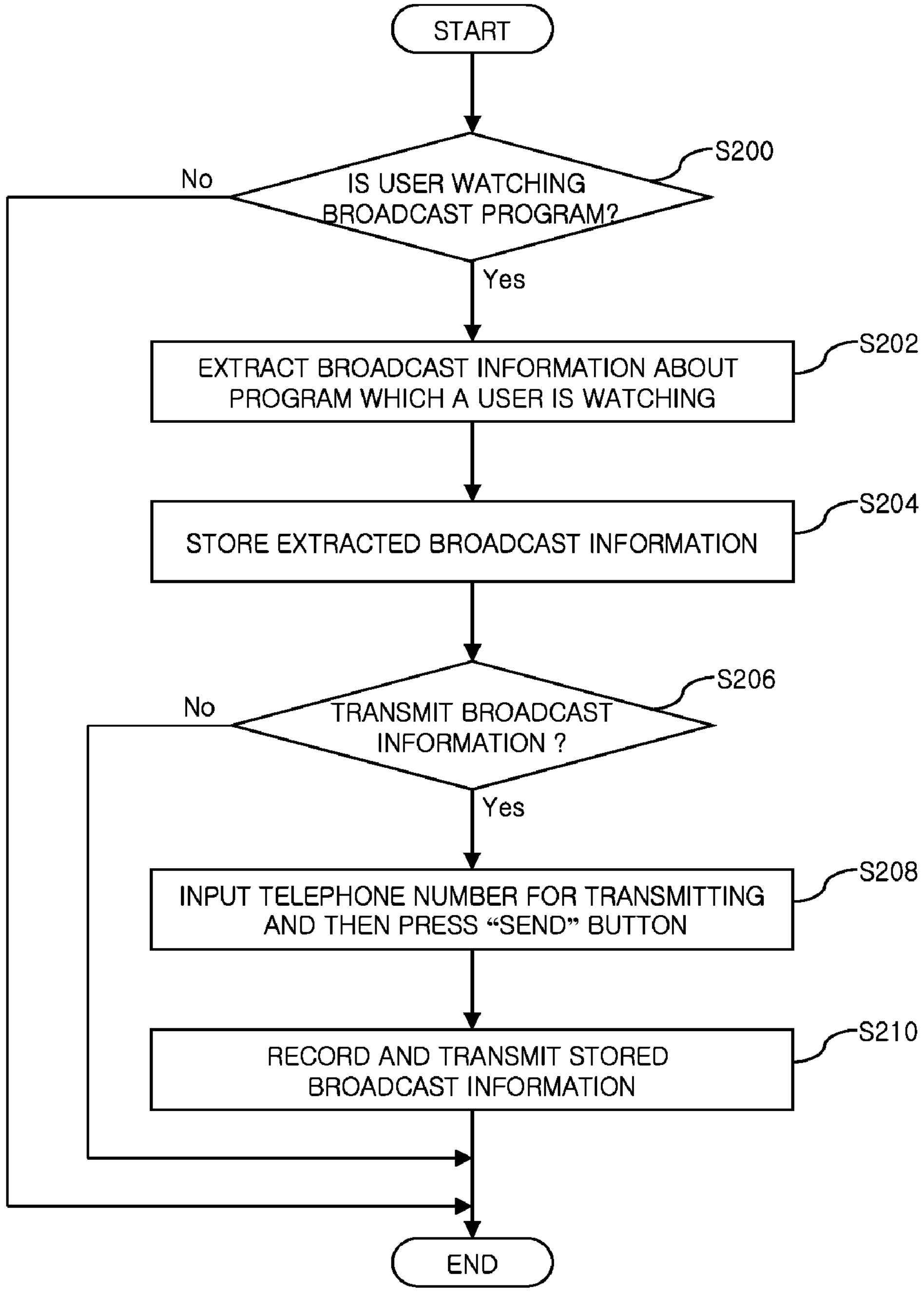
FIG. 5 is a flowchart of a method of transmitting broadcast information according to one embodiment.

Referring to FIG. 5, when a user is to watch a broadcasting program, a broadcasting program list including a channel, a broadcast time, a viewable age, a remaining running time of the broadcasting program is downloaded through a WIPI Application (S200). When the broadcasting program list including additional information is downloaded, the WIPI Application extracts broadcasting information recorded in a field of the additional information from the broadcasting program (S202). Then, the WIPI Application stores the extracted broadcasting information in a file system (S204). When the broadcast information is extracted and stored, if the user wants to transmit the broadcast information (S206), the user inputs the telephone number of a target device and presses a predetermined button (e.g., a "send" button) (S208). When the predetermined button is pressed, the terminal records the broadcast information stored in the file system by using the WIPI Application in a predetermined field of a message and transmits the message to the target terminal (S210).

As described above, according to one embodiment of the present invention, in order to tell other users to watch a broadcast content, the user can transmit the broadcast information for the broadcast content to another device. Therefore, the user can transmit the broadcast information to other user without having to talk over the telephone or in person.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for communicating in a wireless communication system, the method comprising:

receiving, at a mobile terminal, broadcast information relating to broadcast content;

storing the broadcast information in memory associated with the mobile terminal;

displaying the broadcast content that is currently being broadcasted by a broadcast provider on a display of the mobile terminal;

receiving an input of a telephone number of a target terminal while the broadcast content is being displayed;

receiving an input for call connection after receiving the input of the telephone number of the target terminal;

generating a request message for call connection in response to the input for call connection, the request message comprising a designated field for storing the broadcast information including at least information for identifying the broadcast provider or a broadcast channel on which the broadcast content is broadcasted;

automatically transmitting the generated request message to the target terminal to establish communication with the target terminal for a call; and causing displaying of the transmitted request message at the target terminal upon establishing the communication for the call, permitting the target terminal to tune to the broadcast channel identified by the at least information included in the request message, and to display the broadcast content that is currently being displayed on the display of the mobile terminal.

2. The method according to claim 1, wherein the request message is an origination message.

3. The method according to claim 1, wherein the request message further comprises a mobile identification number (MIN), an electronic serial number (ESN), and the telephone number of the target terminal.

4. The method according to claim 1, wherein the broadcast information further comprises parental guidance information for the broadcast content.

5. The method according to claim 1, wherein the receiving of the broadcast information comprises:

receiving the broadcast information via an IP protocol network.

6. The method according to claim 1, wherein the broadcast information includes one or more of a program starting/ending time, a length of a program name, a uniform resource locator (URL), a broadcasting program channel, a broadcast time, a viewable age, or remaining running time of the broadcast content.

7. A mobile terminal, comprising:

a transceiver configured to receive broadcast information relating to broadcast content;

a memory configured to store the broadcast information;

a display configured to display the broadcast content currently being broadcasted by a broadcast provider;

an input unit; and a controller configured to:

receive an input of a telephone number of a target terminal via the input unit while the broadcast content is being displayed;

generate a request message for call connection upon receiving an input for call connection via the input unit after receiving the input of the telephone number of the target terminal, the request message comprising a designated field for storing the broadcast information including at least information for identifying the broadcast provider or a broadcast channel on which the broadcast content is broadcasted; and automatically transmit the generated request message to the target terminal to establish communication with the target terminal for a call, wherein the transmitted request message, which is received by the target terminal upon establishing the communication for the call, causes displaying of the request message at the target terminal, permitting the target terminal to tune to the broadcast channel identified by the at least information included in the request message, and to display the broadcast content that is currently being displayed on the display of the mobile terminal.

8. The mobile terminal according to claim 7, wherein the request message is an origination message.

9. The mobile terminal according to claim 7, wherein the broadcast information further comprises data identifying timing information associated with the broadcast content, wherein the timing information comprises at least one of a program starting time, a program ending time, or a program duration, of the broadcast content.

10. The mobile terminal according to claim 7, wherein the broadcast information further comprises parental guidance information for the broadcast content.

11. The mobile terminal according to claim 7, wherein the request message further comprises a mobile identification number (MIN), an electronic serial number (ESN), and the telephone number of the target terminal.

12. The mobile terminal according to claim 7, wherein the receiving of the broadcast information by the transceiver comprises:

receiving the broadcast information via an IP protocol network.

13. The mobile terminal according to claim 7, wherein the broadcast information includes one or more of a program starting/ending time, a length of a program name, a uniform resource locator (URL), a broadcasting program channel, a broadcast time, a viewable age, or remaining running time of the broadcast content.

* * * * *